(12) United States Patent
Kato et al.

(10) Patent No.: US 9,061,517 B2
(45) Date of Patent: Jun. 23, 2015

(54) INK JET PRINTING APPARATUS, INK JET PRINTING METHOD, DATA GENERATING APPARATUS, AND STORAGE MEDIUM

(75) Inventors: Ryota Kato, Yokohama (JP); Yoshitomo Marumoto, Yokohama (JP); Hitoshi Tsuboi, Kawasaki (JP); Hiromitsu Yamaguchi, Yokohama (JP); Yohei Masada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 12/951,386

(22) Filed: Nov. 22, 2010

(65) Prior Publication Data
US 2011/0148959 A1    Jun. 23, 2011

(30) Foreign Application Priority Data
Dec. 18, 2009 (JP) .................... 2009-287541

(51) Int. Cl.
| | | |
|---|---|---|
| B41J 2/205 | (2006.01) | |
| B41J 2/21 | (2006.01) | |
| G06K 15/10 | (2006.01) | |
| H04N 1/60 | (2006.01) | |

(52) U.S. Cl.
CPC ............ *B41J 2/2132* (2013.01); *G06K 15/102* (2013.01); *H04N 1/6022* (2013.01); *H04N 1/6097* (2013.01)

(58) Field of Classification Search
USPC ........................................... 347/15
See application file for complete search history.

(56) References Cited

U.S. PATENT DOCUMENTS

| | | | |
|---|---|---|---|
| 5,825,377 A * | 10/1998 | Gotoh et al. .................... 347/15 |
| 7,438,374 B2 | 10/2008 | Shibata et al. |
| 8,091,975 B2 | 1/2012 | Kaneko et al. |
| 2005/0219294 A1 | 10/2005 | Nakazawa et al. |
| 2008/0150979 A1 | 6/2008 | Shibata et al. |
| 2008/0246791 A1 | 10/2008 | Kaneko et al. |
| 2009/0015849 A1 | 1/2009 | Jahana et al. |
| 2009/0086231 A1 | 4/2009 | Marumoto |

FOREIGN PATENT DOCUMENTS

| | | |
|---|---|---|
| JP | 11-320899 A | 11/1999 |
| JP | 2001-039006 A | 2/2001 |
| JP | 2005-262570 A | 9/2005 |
| JP | 2005-297212 A | 10/2005 |
| JP | 4062027 B2 | 3/2008 |
| JP | 2008-173969 A | 7/2008 |

OTHER PUBLICATIONS

Japanese Office Action issued in corresponding application No. 2009-287541 dated Sep. 10, 2013, along with its English-language translation—5 pages.

* cited by examiner

*Primary Examiner* — Uyen Chau N Le
*Assistant Examiner* — Chad Smith
(74) *Attorney, Agent, or Firm* — Fitzpatrick, Cella, Harper & Scinto

(57) ABSTRACT

The present invention provides an inkjet printing apparatus and an inkjet printing method for printing a high-definition image while improving glossiness of the image surface without causing complication and enlargement of the apparatus. A plurality of inks are ejected from first and second printing heads so that a weighted average of a printing rate for each scan regarding an ink having the highest lightness becomes the largest among the plurality of inks and so that a maximum value regarding the printing rate of the ink having the highest lightness becomes larger than those of other inks.

18 Claims, 12 Drawing Sheets

INK JET PRINTING APPARATUS, INK JET PRINTING METHOD, DATA GENERATING APPARATUS, AND STORAGE MEDIUM

BACKGROUND OF THE INVENTION

1. Field of the Invention

The present invention relates to an inkjet printing apparatus, an inkjet printing method, a data generating apparatus, and a storage medium for printing an image using a printing head, equipped with a nozzle array for each of a plurality of different inks, by a plurality of scans on the same printing area on a printing medium.

2. Description of the Related Art

There is a multipass printing method for printing an image stepwise by a plurality of printing scans onto the same printing area on the printing medium, as a printing method in the inkjet printing apparatus. This printing mode prints an image while repeating the following two operations: performing a printing scan of ejecting an ink from a printing head while moving the printing head in a main scan direction; and a conveyance operation of conveying the printing medium in a sub-scan direction by 1/N times a printing width by a single printing scan. In such multipass printing, since the printing medium is conveyed between a preceding printing scan and a next printing scan, ink droplets are provided from the printing head on the same printing area of the printing medium at intervals of a predetermined time. Therefore, in the printing medium whose adsorption speeds of pigment inks are slow, such as plain paper, since the printing can be performed while the ink droplets given thereon is being dried, fixability of the ink can be improved.

However, when the multipass printing is performed on the printing medium on whose surface a special treatment was given, such as glossy paper, a glossiness feature in the printing portion of the image may be impaired.

Generally, in the printing medium like the glossy paper, in order to improve absorption of an ink solvent and fixation of a coloring material, fine holes are provided on its surface, and a dye colorant is absorbed thereinto together with moisture through the holes. However, in the case of the pigment ink, its pigment molecule is hard to dissolve in water and is dispersed in the moisture as particulates. Since these particulates are larger than the holes of the surface of the printing medium, it is hard for the coloring material to permeate into the interior of the printing medium. That is, since the particulates of the pigment will be fixed on the surface of the printing medium while being deposited thereon, it is considered that smoothness on the surface of the printing medium is impaired and its glossiness is lost.

Furthermore, in the multipass printing, when the pigment ink whose coloring material does not permeate easily into the interior of the printing medium is used, ink droplets applied by each printing scan dries one by one on the printing medium, and are fixed while they are piled on one another. For example, in the case of the multipass printing (4-pass printing) that scans four times the same printing area on the printing medium to complete an image, layers of ink are piled up in four steps. On the other hand, in the case of the single pass printing (1-pass printing) that completes an image by scanning once the same printing area on the printing medium, the ink layer is made in a single step. Therefore, when the multipass printing is adopted, the unevenness on the surface of the printing medium becomes intense compared with the case of the single pass printing, and the glossiness feature of the surface becomes easily lost.

In the inkjet printing method, it is known that if the ink droplets applied on the printing medium by the same scan (the same pass) contact each other before fixation completes on the printing medium surface, leveling will arise, the unevenness of the printing medium surface will decrease, and its glossiness will increase.

Japanese Patent Laid-Open 2005-297212 discloses a technology of realizing suitable glossiness by altering contact probability between the two ink droplets and thereby controlling the degree of leveling. That is, according to the technology of Japanese Patent Laid-Open 2005-297212, the number of passes is altered by selecting the number of passes or a mask pattern according to the glossiness feature of the printing medium in the inkjet printing apparatus using the pigment ink, and a printing rate per pass is raised or lowered.

On the other hand, as a technique for realizing simultaneously the degree of glossiness and granularity of a printed part of an image, there is known a technology of, after printing an image with a colored ink, applying a colorless polymer to coat the image (Japanese Patent Laid-Open No. 2001-039006). Moreover, there is also known a technology of, after printing an image with a pigment ink, performing a laminating processing on it (Japanese Patent Publication No. 4062027.)

However, with the method disclosed in Japanese Patent Laid-Open No. 2005-297212, there is a possibility that beading where the ink droplets adhere each other to effect localization occurs and the granularity of the image deteriorates. Moreover, in the case where the ink dots formed beforehand inhibits permeation of the ink droplets (subsequent ink droplets) that are applied after that, there is a possibility that the subsequent inks gather to coagulate in an uncolored area of the printing medium where the ink dots are not formed. In this case, there is a possibility that the subsequent ink whose colorant concentration is high becomes bulky at the time of coagulation, which makes unevenness of the surface of the printing medium rough, increases scattered rays, and deteriorates the degree of glossiness of the surface. Furthermore, since an ink having high colorant-concentration and low lightness is conspicuous, if it localizes and coagulates, there is a possibility that the granularity of the image may deteriorate more. As a result, there is possibility that the granularity of the image deteriorates, the unevenness of the surface of the printing medium increases, and consequently an effect of improving the glossiness may be impaired. Especially, when printing an image of high density, since an ink having high colorant-concentration will be used, the unevenness of the surface of the printing medium will increase easily and the glossiness will deteriorate easily.

Moreover, by methods disclosed by Japanese Patent Laid-Open No. 2001-039006 and Japanese Patent Publication No. 4062027, since a coating processing and a laminating processing are required, there is a possibility that they invite complication, enlargement, and higher cost of the whole of the image printing system.

SUMMARY OF THE INVENTION

The present invention provides an inkjet printing apparatus, an inkjet printing method, a data generating apparatus, and a storage medium capable of printing a high-quality image while improving glossiness of an image surface without causing complication and enlargement of the apparatus.

In the first aspect of the present invention, there is provided an inkjet printing apparatus for printing an image on a printing medium by ejecting inks of a plurality of colors from a plurality of nozzles of a printing head during a plurality of scans of the printing head in a main scanning direction onto the same printing area on the printing medium, the plurality of nozzles being arranged so as to form a plurality of nozzle arrays for each of the inks of the plurality of colors, each of the plurality of nozzle arrays extending along a sub scanning direction crossing to the main scanning direction, the inkjet printing apparatus comprising:

a control unit configured to eject the inks of the plurality of colors from the printing head so that a weighted average of a printing rate for each scan regarding an ink having the highest lightness among the inks of the plurality of colors becomes the largest and so that a maximum value of the printing rate regarding the ink having the highest lightness becomes larger than that of the other ink, wherein the weighted average of the printing rate is calculated by $\Sigma(n \times f_x(n))/\Sigma f_x(n)$, $f_x(n)$ meaning the printing rate of an n-th scan regarding each ink, and $\Sigma$ meaning taking a sum of $f_x(n)$ from 1 to a total number of scans N with respect to n.

In the second aspect of the present invention, there is provided an inkjet printing apparatus for printing an image on a printing medium by ejecting inks of a plurality of colors from a plurality of nozzles of a printing head during a plurality of scans of the printing head in a main scanning direction onto the same printing area on the printing medium, the plurality of nozzles being arranged so as to form a plurality of nozzle arrays for each of the inks of the plurality of colors, each of the plurality of nozzle arrays extending along a sub scanning direction crossing to the main scanning direction, the inkjet printing apparatus comprising:

a control unit configured to eject the inks of the plurality of colors from the printing head so that a weighted average of a printing rate for each scan regarding an ink having the highest lightness among the inks of the plurality of colors becomes the largest and so that a variance of the printing rate from the weighted average regarding the ink having the highest lightness becomes smaller than the that of the other ink, wherein the weighted average of the printing rate is calculated by $\Sigma(n \times f_x(n))/\Sigma f_x(n)$, and the variance from the weighted average is calculated by $\Sigma((n-G_x)^2 \times f_x(n))/\Sigma f_x(n)$, $f_x(n)$ meaning the printing rate of an n-th scan regarding each ink, $\Sigma$ meaning taking a sum of $f_x(n)$ from 1 to a total number of scans N with respect to n, and $G_x$ meaning the weighted average regarding each ink.

In the third aspect of the present invention there is provided an inkjet printing method for printing an image on a printing medium by ejecting inks of a plurality of colors from a plurality of nozzles of a printing head during a plurality of scans of the printing head in a main scanning direction onto the same printing area on the printing medium, the plurality of nozzles being arranged so as to form a plurality of nozzle arrays for each of the inks of the plurality of colors, each of the plurality of nozzle arrays extending along a sub scanning direction crossing to the main scanning direction, comprising the step of:

ejecting the inks of the plurality of colors from the printing head so that a weighted average of a printing rate for each scan regarding an ink having the highest lightness among the inks of the plurality of colors becomes the largest and so that a maximum value of the printing rate regarding the ink having the highest lightness becomes larger than that of the other ink, wherein the weighted average of the printing rate is calculated by $\Sigma(n \times f_x(n))/\Sigma f_x(n)$, $f_x(n)$ meaning the printing rate of an n-th scan regarding each ink, and $\Sigma$ meaning taking a sum of $f_x(n)$ from 1 to a total number of scans N with respect to n.

In the fourth aspect of the present invention, there is provided an inkjet printing method for printing an image on a printing medium by ejecting inks of a plurality of colors from a plurality of nozzles of a printing head during a plurality of scans of the printing head in a main scanning direction onto the same printing area on the printing medium, the plurality of nozzles being arranged so as to form a plurality of nozzle arrays for each of the inks of the plurality of colors, each of the plurality of nozzle arrays extending along a sub scanning direction crossing to the main scanning direction, comprising the step of:

ejecting the inks of the plurality of colors from the printing head so that a weighted average of a printing rate for each scan regarding an ink having the highest lightness among the inks of the plurality of colors becomes the largest and so that a variance of the printing rate from the weighted average regarding the ink having the highest lightness becomes smaller than the that of the other ink, wherein the weighted average of the printing rate is calculated by $\Sigma(n \times f_x(n))/\Sigma f_x(n)$, and the variance from the weighted average is calculated by $\Sigma((n-G_x)^2 \times f_x(n))/\Sigma f_x(n)$, $f_x(n)$ meaning the printing rate of an n-th scan regarding each ink, $\Sigma$ meaning taking a sum of $f_x(n)$ from 1 to a total number of scans N with respect to n, and $G_x$ meaning the weighted average regarding each ink.

In the fifth aspect of the present invention, there is provided a data generating apparatus for generating data based on which a printing head ejects ink droplets of a plurality of colors during a plurality of scans of the printing head onto the same printing area on a printing medium, the data generating apparatus comprising:

a generating unit configured to generates data based on which the printing head ejects the inks of the plurality of colors so that a weighted average of a printing rate for each scan regarding an ink having the highest lightness among the inks of the plurality of colors becomes the largest and so that a maximum value of the printing rate regarding the ink having the highest lightness becomes larger than that of the other ink, wherein the weighted average of the printing rate is calculated by $\Sigma(n \times f_x(n))/\Sigma f_x(n)$, $f_x(n)$ meaning the printing rate of an n-th scan regarding each ink, and $\Sigma$ meaning taking a sum of $f_x(n)$ from 1 to a total number of scans N with respect to n.

In the sixth aspect of the present invention, there is provided a storage medium that stores a computer-readable program for making a computer operate as a data generating apparatus for generating data based on which a printing head ejects ink droplets of a plurality of colors during a plurality of scans of the printing head onto the same printing area on a printing medium, wherein the computer operates as the data generating apparatus for generating data based on which the printing head ejects the inks of the plurality of colors so that a weighted average of a printing rate for each scan regarding an ink having the highest lightness among the inks of the plurality of colors becomes the largest and so that a maximum value of the printing rate regarding the ink having the highest lightness becomes larger than that of the other ink, wherein the weighted average of the printing rate is calculated by $\Sigma(n \times f_x(n))/\Sigma f_x(n)$, $f_x(n)$ meaning the printing rate of an n-th scan regarding each ink, and Σ meaning taking a sum of $f_x(n)$ from 1 to a total number of scans N with respect to n.

According to the present invention, dots are formed on a top surface of the printing area, on which the printing is performed by a plurality of scans, with an ink having a highest lightness among a plurality of inks. Thereby, it is possible to lessen the unevenness of the top surface and improve glossiness of the image surface by making these inks contact each other on the printing medium. Furthermore, for the ink having a highest lightness and other inks, relationships among a weighted average of a printing rate, a maximum value of the printing rate, and a variance from the weighted average of them are set up. Thereby, it is possible to print the high-quality image by suppressing deterioration of granularity of the image caused by excessive contact of the ink.

Further features of the present invention will become apparent from the following description of exemplary embodiments (with reference to the attached drawings).

DESCRIPTION OF THE EMBODIMENTS

Hereafter, the embodiment of the present invention will be explained based on drawings.
(First Embodiment)

Figure 1A:
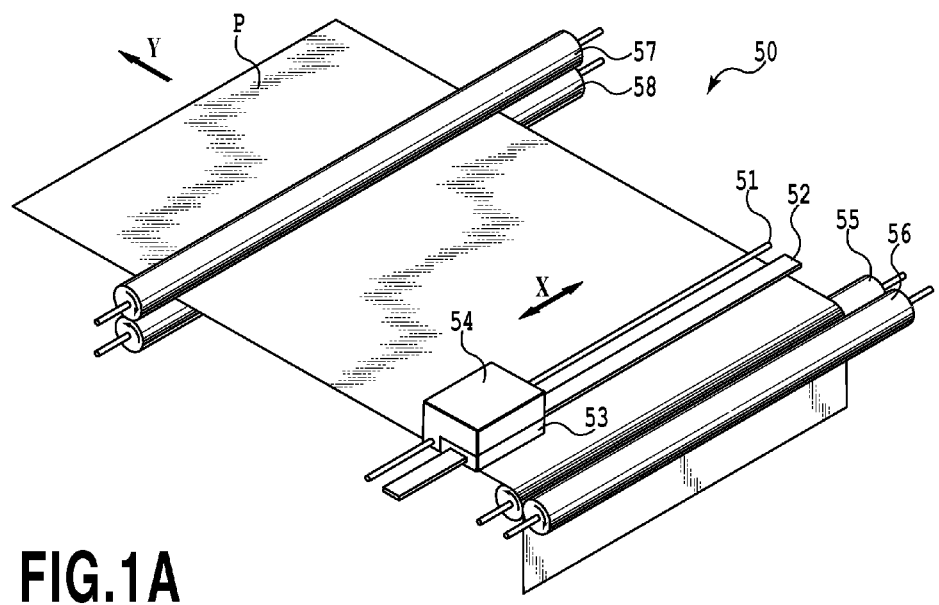
FIG. 1A is an outline perspective diagram of a principal part of an inkjet printing apparatus to which the present invention can be applied.

FIG. 1A is an outline perspective diagram of a principal part for explaining a configuration of a printing apparatus to which the present invention can be applied. A printing apparatus 50 of this example is a printing apparatus of a serial scanning method, wherein a carriage 53 is guided by guide axes 51, 52 in a movable manner in a main scanning direction of an arrow X. The carriage 53 is made to reciprocate in the main scanning direction by a driving force transfer mechanism consisting of a carriage motor, a belt for transferring its driving force, etc. The carriage 53 carries a printing head 10 (not illustrated in FIG. 1A) and an ink tank 54 for supplying an ink to the printing head 10. The printing head 10 and the ink tank 54 may be ones that constitute an inkjet cartridge. Paper P as a printing medium is conveyed to a sub scanning direction of an arrow Y that crosses (in the case of this example, perpendicularly) the main scanning direction by feed rollers 55, 56 and conveying rollers 57, 58. The printing apparatus 50 prints an image sequentially on the paper P by repeating a printing operation of, while the printing head 10 is being moved in the main scanning direction, ejecting the ink toward the paper P, and a conveyance operation of conveying the paper P in the sub scanning direction by a predetermined amount.

Figure 1B:
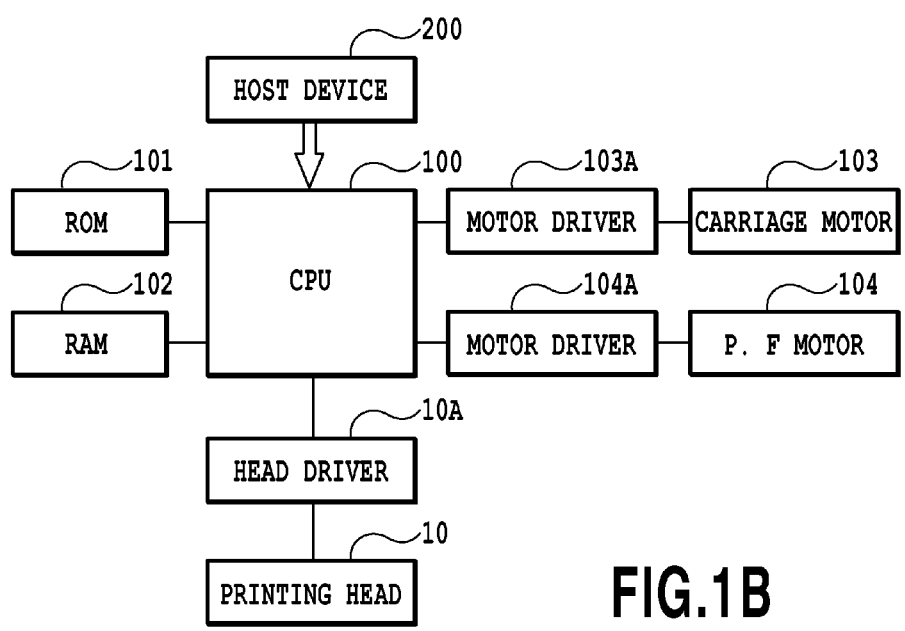
FIG. 1B is a block diagram of a control system of the inkjet printing apparatus of FIG. 1A.

FIG. 1B is an outline block diagram of a control system of a printing apparatus to which the present invention can be applied. A CPU 100 performs a control processing of an operation of this printing apparatus, a data processing, etc. ROM 101 stores programs of these procedures etc. RAM 102 is used as a work area for performing these processing or the like. The printing head 10 is equipped with a plurality of ejection openings, a plurality of ink flow channels communicating respective ejection openings, and a plurality of ejection energy generation elements placed at respective ink flow channels, and these form a plurality of nozzles each capable of ejecting ink. As the ejection energy generation element, an electric heat conversion element (heater), a piezoelectric element, etc. can be used. In the case where the electric heat conversion element is used, the ink in the ink flow channel can be bubbled by heat generation of the electric heat conversion element, and the ink can be ejected from the ejection opening by using the bubbling energy. Ejection of the ink from the printing head 10 is performed by the CPU 100 driving the electric heat conversion element through a head driver 10A. The CPU 100 controls a carriage motor 103 for driving the carriage 53 in the main scanning direction through a motor driver 103A, and controls a P. F motor 104 for conveying the paper P to the sub scanning direction through a motor driver 104A.

Figure 2A:
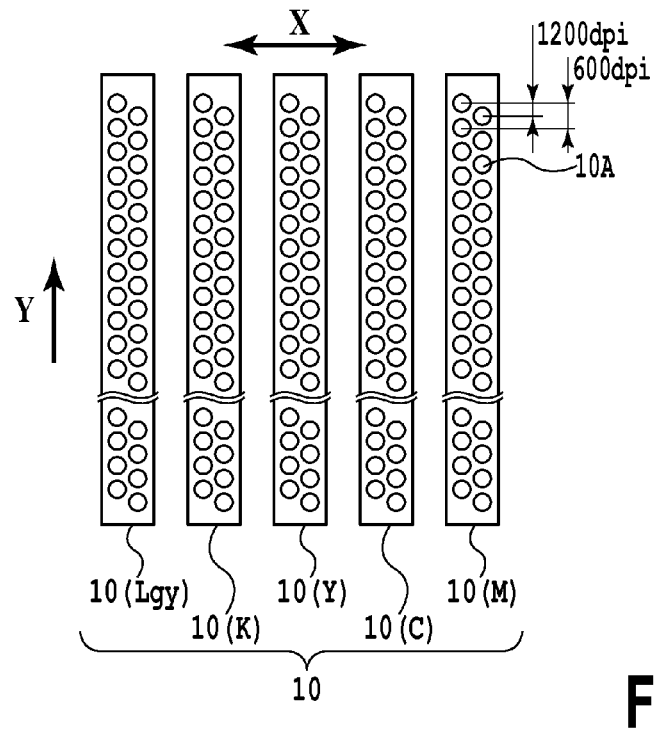
FIG. 2A is an explanatory diagram of a configuration example of a printing head that is used in a first embodiment of the present invention.

FIG. 2A shows a configuration example of the printing head used in this embodiment. In the case of this example, five printing heads having a plurality of ejection openings 10A are mounted on the carriage 53 detachably. Reference numbers 10 (C), 10 (M), 10 (Y), and 10 (K) denote printing heads for ejecting inks of cyan (C), magenta (M), yellow (Y), and black (K), respectively. Moreover, reference number 10 (Lgy) denotes a printing head for ejecting ink of light gray (Lgy).

In each printing head, two nozzle arrays are formed along a direction crossing the main scanning direction of the arrow X (in the case of this example, a direction perpendicular to it). In each nozzle array, the plurality of ejection openings 10A are arranged with a pitch of 600 dpi (dot/inch) to form many nozzles (for example, 624 nozzles). Moreover, in the each printing head, the ejection openings of one nozzle array among two nozzle arrays are shifted to the ejection openings 10A of the other nozzle array by 1200 dpi that is a half pitch. Therefore, the each printing head is virtually equivalent to a printing head such that many nozzles (for example, 1248 nozzles) are arranged in a single array with a pitch of 1200 dpi. Below, an explanation will be given assuming that the each printing head has 1248 nozzles arranged in a single array with a pitch of 1200 dpi.

In this embodiment, an image printed by inks of cyan (C), magenta (M), yellow (Y), and black (K) is completed by 16 scans (16 passes), respectively; an image printed by ink of the light gray (Lgy) is completed by eight scans (eight passes). That is, the present embodiment adopts a multipass printing method for completing an image of total five colors by 24 scans (24 passes) of the printing head.

In the case of this example, 1248 nozzles in each printing head are divided into 24 nozzle regions each having 52 nozzles. In the printing heads 10(C), 10(M), 10(Y), and 10(K), nozzles of 16 nozzle regions of the 24 nozzle regions are used for the printing of the image. In the printing head (Lgy), the nozzles of eight nozzle regions of the 24 nozzle regions are used for the printing of the image.

Figure 12:
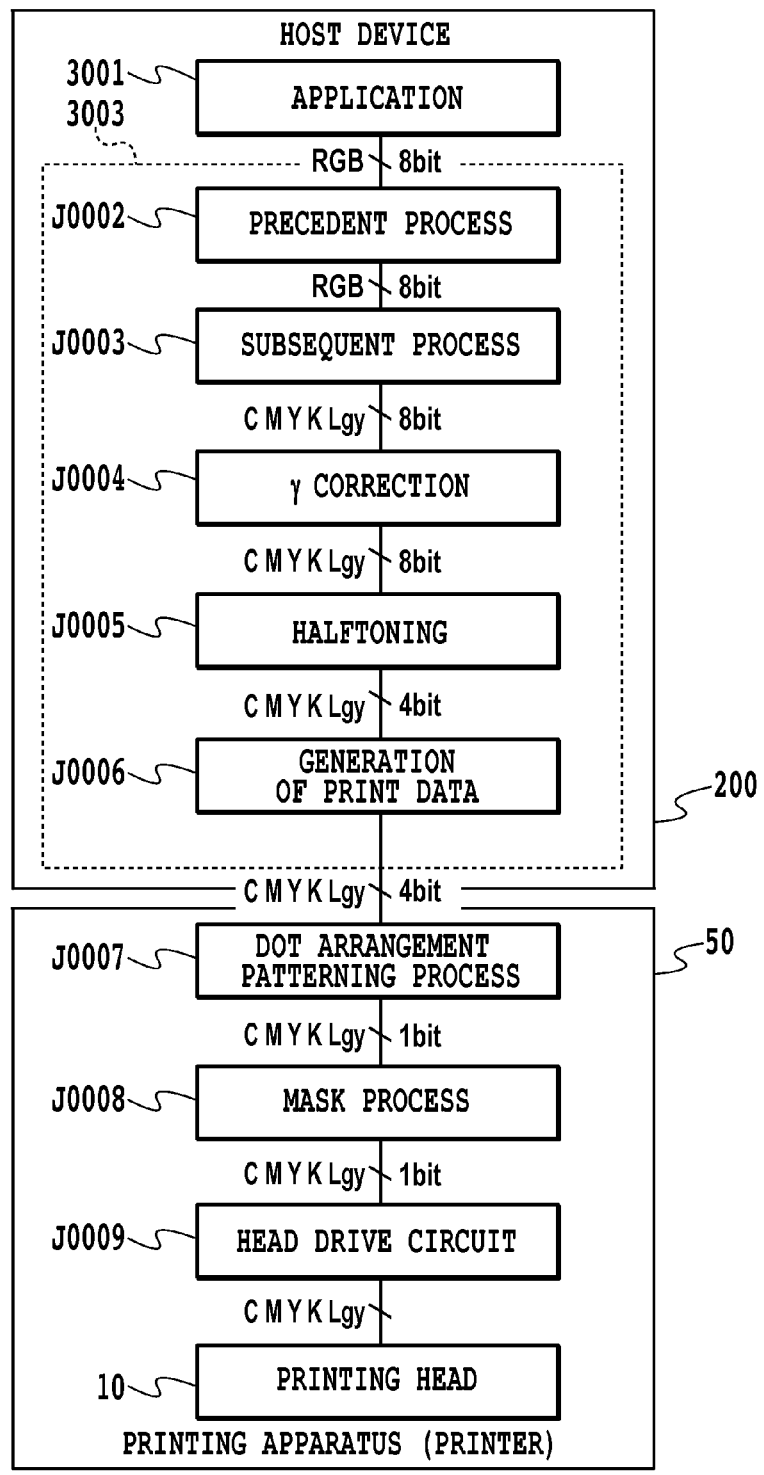
FIG. 12 is an explanatory diagram of a conversion processing of image data in the first embodiment of the present invention.

Here, a flow of an image data conversion processing in the printing system of this embodiment will be explained using FIG. 12. The printing system in this embodiment consists of a host device 200 and the printing apparatus 50. In this embodiment, the host device 200 performs generation of image data indicating an image to be printed, a setup of UI (user interface) for that data generation, etc. The printing apparatus 50 performs printing using the above-mentioned inks of C, M, Y, K, and Lgy.

At the time of execution of the printing, image data generated by an application 3001 is passed to a printer driver 3003 through OS 3002. The printer driver 3003 performs a precedent process J0002, a subsequent process J0003, γ correction J0004, halftoning J0005, and a print data generation process J0006 on the received image data. Below, each process will be explained briefly.

The precedent process J0002 performs mapping of a color gamut (Gamut). This process performs data conversion that maps a color gamut reproduced by image data R, G, and B of the sRGB standard to a color gamut reproduced by the printing apparatus. Concretely, data of 256 gradations indicated by each of R, G, and B in 8-bit is converted into data of R, G, and B in 8-bit of different contents by using a three-dimensional LUT.

Based on R, G, and B data subjected to mapping of the above-mentioned color region, the subsequent process J0003 finds color separation data C, M, Y, K, and Lgy each of 8 bits that corresponds to a combination of the inks for reproducing a color indicated by these R, G, and B data. Here, like the precedent process, the subsequent process is done using together interpolating calculation with the three-dimensional LUT.

The γ correction J0004 performs density value conversion (gradation value conversion) for data of each color of the color separation data obtained by the subsequent process J0003. Concretely, it performs a conversion wherein a one-dimensional LUT corresponding to a gradation characteristic of each ink of the printing apparatus is used to associate linearly the above-mentioned color separation data with a gradation characteristic of the printing apparatus.

The halftoning J0005 performs a quantization processing for each of 8-bit color separation data C, M, Y, K, and Lgy, converting them into 4-bit data. In this embodiment, using a multiple-value error diffusion method, the 8-bit data of 256 gradations is converted to create 9-bit data of nine gradations. This 4-bit data is gradation value information indicating any one of the gradations of level 0 to 8 that becomes an index for indicating a dot arrangement pattern of a dot arrangement patterning process J0007 that is a processing performed in the printing apparatus.

The print data generation process J0006 generates print data by adding printing control information of a grade of printing image, a type of the printing medium, printing information such as color or monochromatic etc. to printing image information that is an aggregate of gradation value information.

When the print data is sent to the printing apparatus 50 by the host device 200, the printing apparatus performs a dot arrangement patterning process J0007 and a mask process J0008 on the inputted print data.

In the dot arrangement patterning process J0007, nine-gradation value information of 9-bit data that is an output value from the halftoning J0005 is developed into a dot arrangement pattern to perform a binarization processing. Thereby, binary data indicating presence/absence (ejection or non-ejection) of printing by an ink droplet can be obtained in an area corresponding to a single pixel of multiple values. Here, data of the single pixel of multiple value (4-bits) (hereinafter called a pixel area) is converted, generating data of 2×4 pixels of binary value (1 bit).

Next, the mask process J0008 creates a logical multiplication between a dot arrangement of each color defined by the dot arrangement patterning process J0007 and a plurality of mask patterns being in a mutually complementary relationship. Thereby, a multipass printing that will be described later is performed. Then, by this mask process, in each of colors of C, M, Y, K, and Lgy, data for ejecting the ink droplets in each of printing scans constituting the multipass printing is created.

Then, this binary print data is transferred to a head drive circuit J0009. 1-bit data of each color inputted into the head drive circuit J0009 is converted into a driving pulse of the printing head 10, which makes the ink eject at an appropriate timing in a plurality of printing scans in the multipass printing. Thereby, ink ejection according to the print data is performed, and the printing of an image is performed on the printing medium.

FIG. 3 to FIG. 6B are explanatory diagrams of the multipass printing method in this embodiment. For convenience of explanation, printing heads 10 (C), 10 (M), 10 (Y), and 10 (K) using nozzles in 16 nozzle regions are designated as a first printing head 10 (1), and a printing head 10 (Lgy) using nozzles in eight nozzle regions is designated as a second printing head 10 (2). The nozzle regions used in the first printing head 10 (1) are 16 nozzle regions located on an upstream side of the conveyance direction of the arrow Y, and hereinafter those nozzle regions are designated as nozzle regions A1, A2, A3, . . . , A16 from the upstream side of the conveyance direction to a downstream side. Moreover, the nozzle regions used in the second printing head 10 (2) are 8 nozzle regions located on the downstream side of the conveyance direction of the arrow Y, and hereinafter those nozzle regions are designated as nozzle regions B1, B2, B3, . . . , B8 from the upstream side of the conveyance direction to the downstream side.

Figure 3:
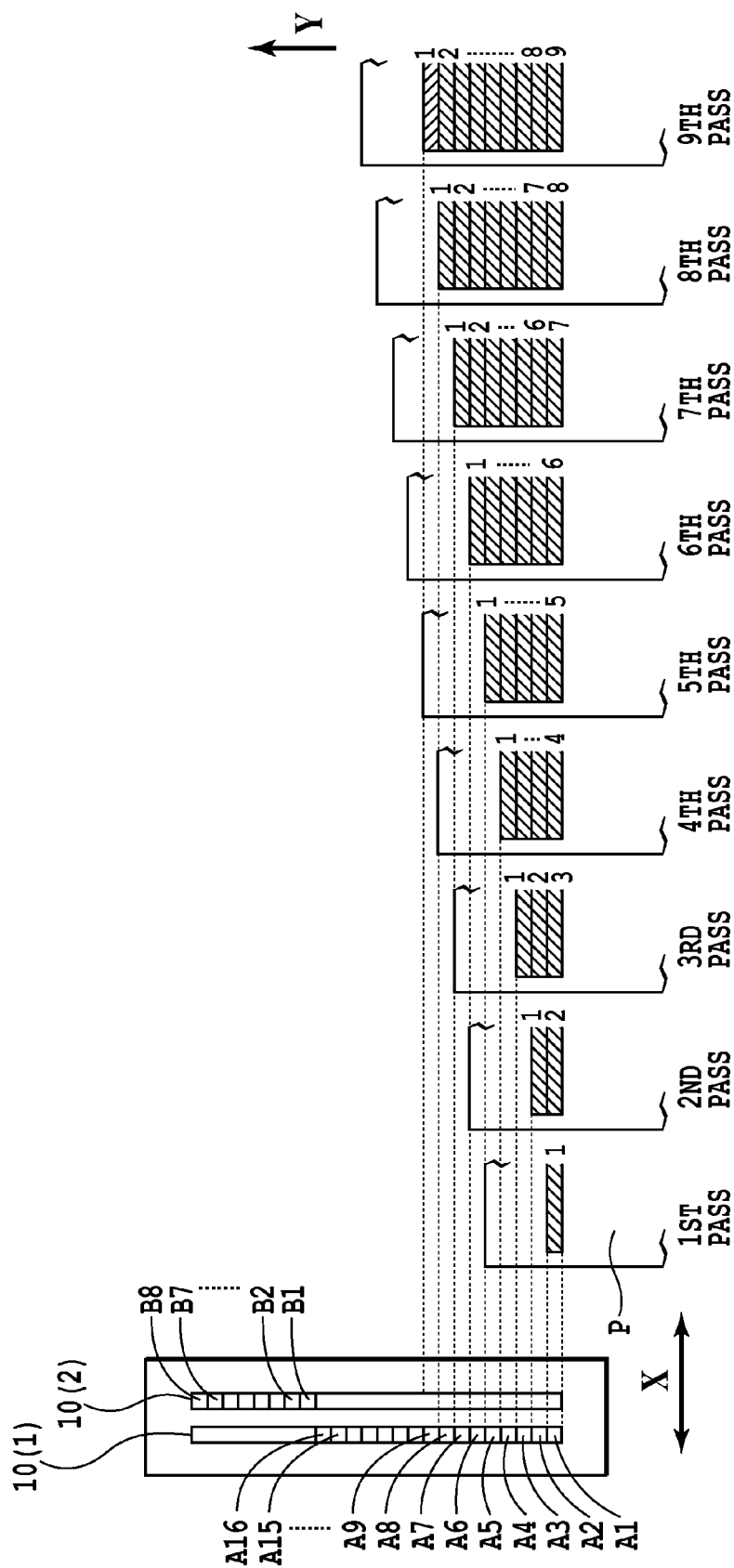
FIG. 3 is an explanatory diagram of a multipass printing method in the first embodiment of the present invention.

FIG. 3 is an explanatory diagram of the 1st pass to the 9th pass, and each time the printing head scans the printing medium P once (one pass), the printing medium P is conveyed by a distance equivalent to the width of 52 nozzles in the sub scanning direction of the arrow Y. The printing medium P is conveyed similarly also after the 10th pass. Moreover, the printing area on the printing medium P equivalent to the amount of onetime conveyance of the printing medium P is designated as printing areas 1, 2, 3 - - - as going up from the downstream side to the upstream side. In the first pass, the inks of cyan (C), magenta (M), yellow (Y), and black (K) are ejected onto a printing area 1 on the printing medium P from a nozzle region A1; in the second pass, these inks are ejected onto the printing areas 1, 2 from the nozzle regions A1, A2. Then in the 8th pass, those inks are ejected onto the printing areas 1 to 8 from the nozzle regions A1 to A8.

Figure 4:
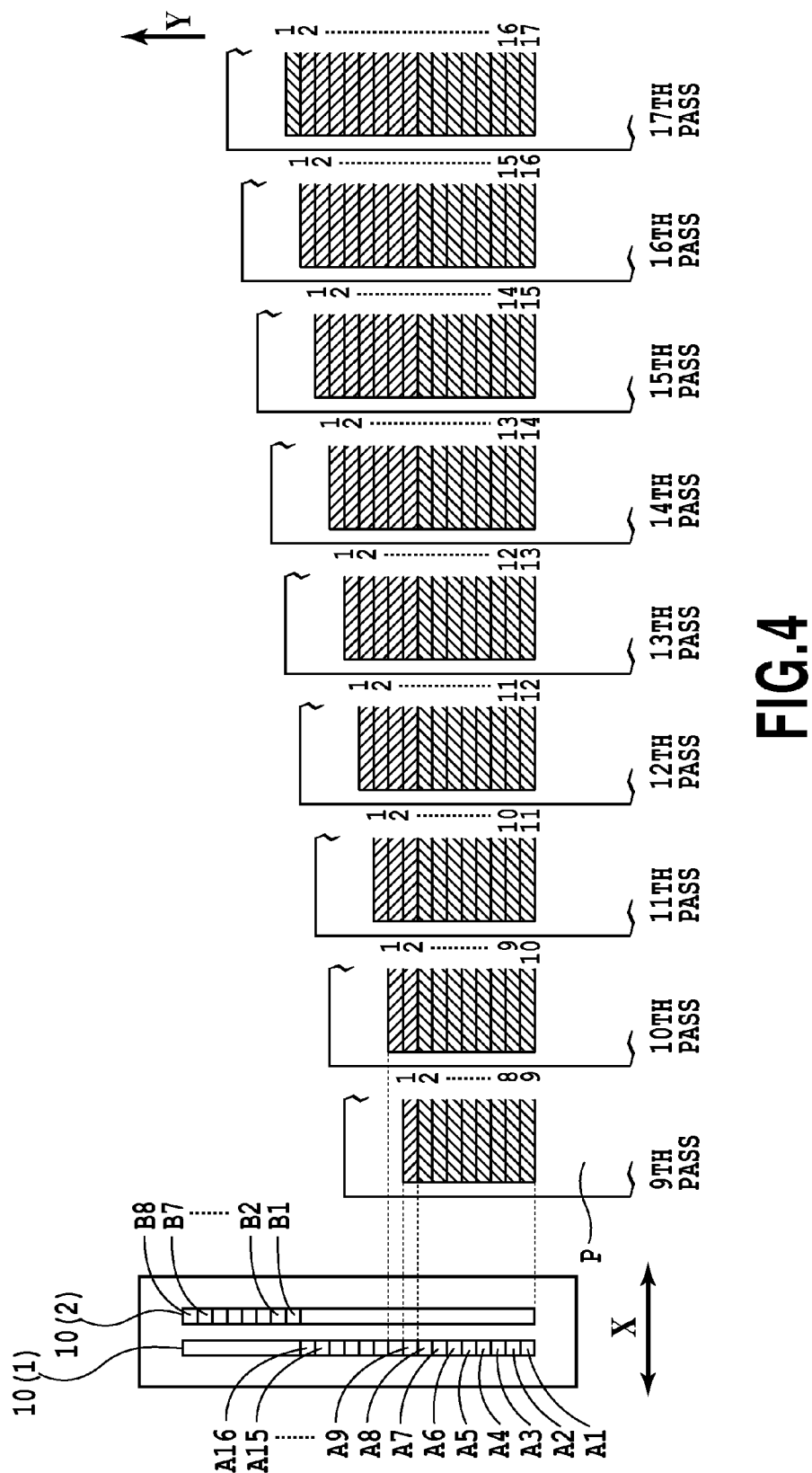
FIG. 4 is an explanatory diagram of the multipass printing method in the first embodiment of the present invention.

FIG. 4 is an explanatory diagram for the 9th pass to the 17th pass. In the 9th pass, the inks of cyan (C), magenta (M), yellow (Y), and black (K) are ejected onto the printing areas 1 to 9 from the nozzle regions A1 to A9. Then, in the 16th pass, those inks are ejected from the nozzle regions A1 to A16 onto the printing areas 1 to 16, whereby an image of these inks is completed in the printing area 1. Thus, the image of the inks of cyan (C), magenta (M), yellow (Y), and black (K) is completed with 16 passes.

Figure 5:
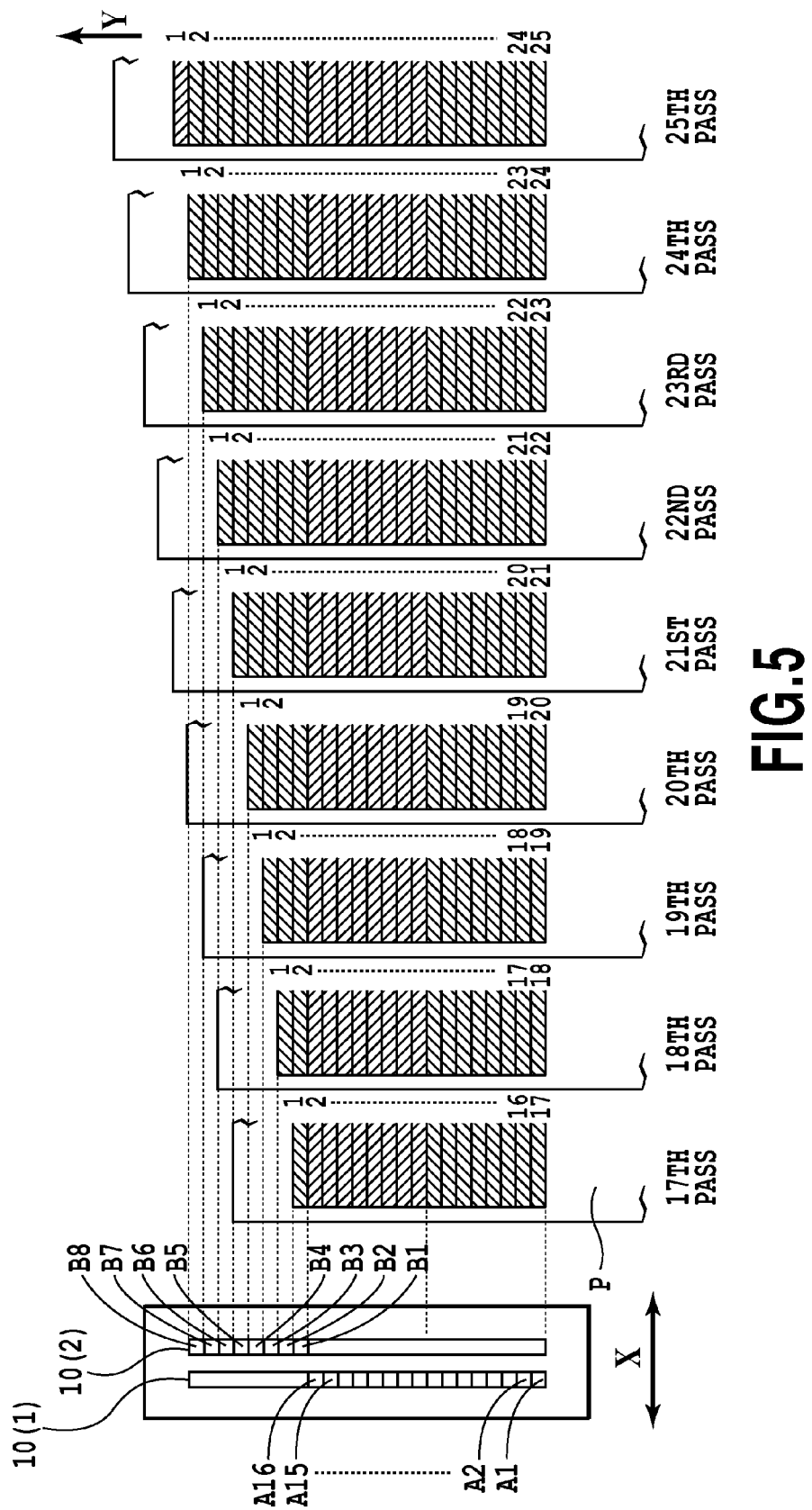
FIG. 5 is an explanatory diagram of the multipass printing method in the first embodiment of the present invention.

FIG. 5 is an explanatory diagram of the 17th pass to the 25th pass. In the 17th pass, the ink of the light gray (Lgy) is ejected from the nozzle region B1 onto the printing area 1 on the printing medium P, and in the 18th pass, that ink is ejected from the nozzle regions B1, B2 onto the printing areas 1, 2. Then, in the 24th pass, that ink is ejected from the nozzle regions B1 to B8, whereby an image of the ink of the light gray (Lgy) is completed in the printing area 1. In this way, the image of the ink of the light gray (Lgy) is completed with eight passes.

Therefore, at 24th pass, the color image of five colors in the area 1 is completed. Subsequently, by the printing heads 10 (1) to 10 (4) repeating the same operation, color images of five colors in the areas 2, 3, 4, . . . are completed sequentially in the 25th, 26th, 27th, . . . passes. That is, the color image of the inks of five colors is completed with 24 passes to the same printing area on the printing medium.

Figure 6A:
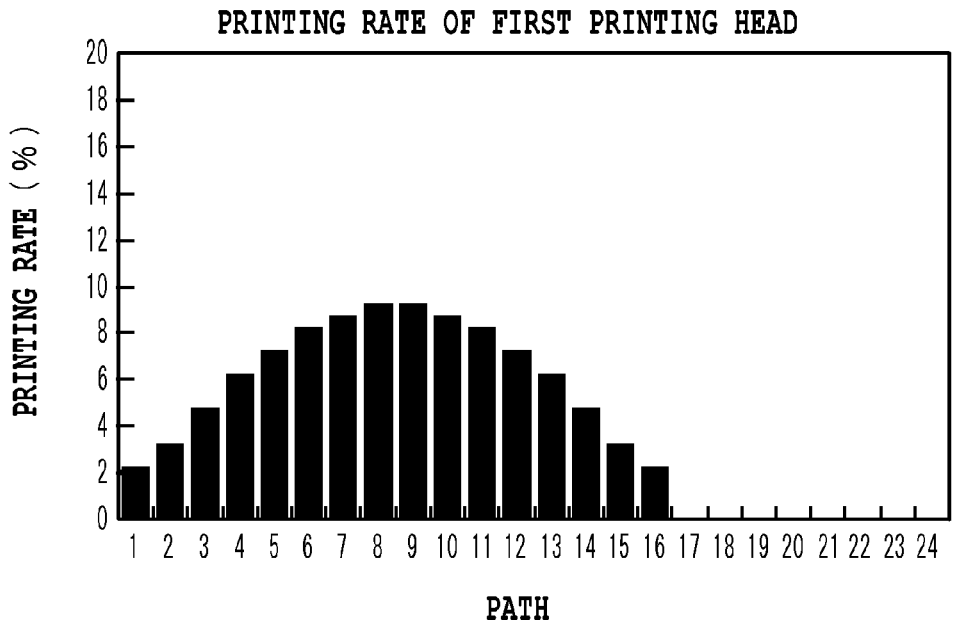
FIG. 6A is an explanatory diagram of a printing rate by a first printing head.
Figure 6B:
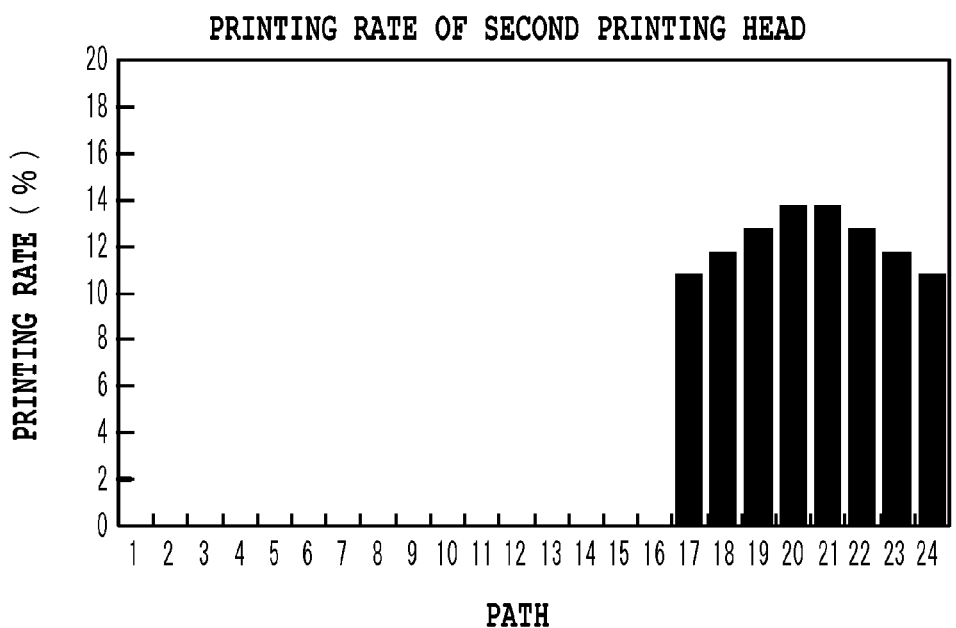
FIG. 6B is an explanatory diagram of the printing rate by a second printing head.
Figure 7A:
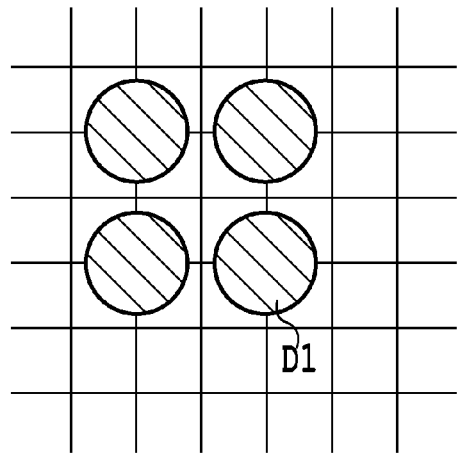
FIG. 7A to FIG. 7D are explanatory diagrams of an example of dot formation.
Figure 7B:
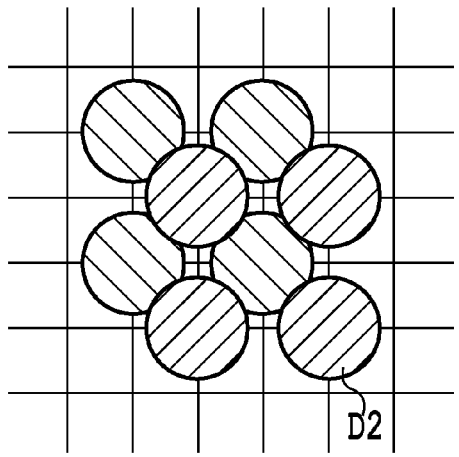
Figure 7C:
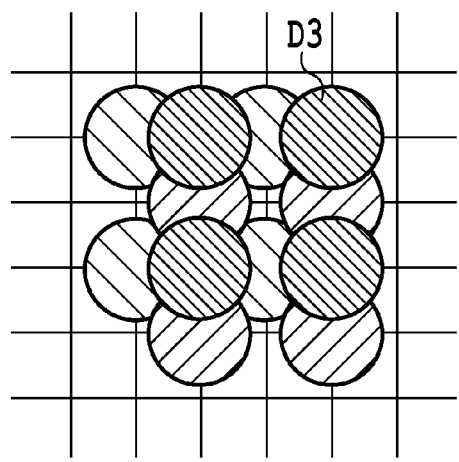
Figure 7D:
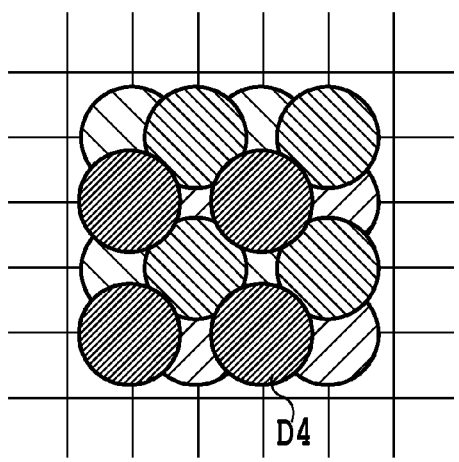

FIG. 6A shows a printing rate (an ejection rate of ink) per pass of the first printing head 10 (1) (the printing heads 10 (Y), 10 (M), 10 (C), and 10 (K)). FIG. 6B shows the printing rate per pass by the second printing head 10 (2) (the printing head (Lgy)). Such a printing rate is set up by the mask patterns that divide the print data corresponding to a pixel for each pass. The mask pattern consists of mask elements that define output/non-output of the print data, and the print data corresponding to ejection/non-ejection of an ink is divided into respective passes by the mask patterns. The "printing rate" also indicates a percentage of the mask elements that define an output of the print data.

Regarding the first printing head 10 (1), the print data of the inks (C, M, Y, and K inks) corresponding thereto is divided into the 1st to the 16th passes, and the printing rate of each of these passes has a relationship of FIG. 6A. Regarding the second printing head 10 (2), the print data of the ink (the Lgy ink) corresponding thereto is divided into the 17th to the 24th passes, and the printing rate of each of these passes has a relationship of FIG. 6B. The mask patterns of the first printing head 10 (1) include 16 mask pattern parts corresponding to the 1st to the 16th passes, these 16 mask patterns are in the mutually complementary relationship, and a sum of these printing rates comes to 100%. The mask patterns of the second printing head 10 (2) include eight mask pattern parts corresponding to the 17th to the 24th passes, these eight mask patterns are in the mutually complementary relationship, and a sum of these printing rates comes to 100%.

In a set of the C, M, Y, K, and Lgy inks (ink set) used in this example, the Lgy ink is an ink having the highest lightness. A weighted average of the printing rate of the Lgy ink is located on a side closest to the 24th pass, that is, on a second-half side among 24 passes (scans) that are necessary for completion of an image by that ink set. The weighted average can be expressed by a following formula (1).

$$\text{weighted average} = \Sigma(n \times f_x(n))/\Sigma f_x(n) \quad (1)$$

Here, $f_x(n)$ means the printing rate of an n-th pass (an n-th scan) of an X ink (C, M, Y, K, or Lgy ink), and $\Sigma$ means taking a sum of $f_x(n)$ from 1 to a total pass number N (a total number of scans N) with respect to n. In the case where N mask pattern parts corresponding to the X ink are mutually in a complementary relationship and N passes create a printing rate (an ejection rate) of 100%, like this example, $\Sigma f_x(n)$ becomes $\Sigma f_x(n)=100(\%)$.

The weighted average of the printing rate of the C, M, Y, and K inks as shown in FIG. 6A becomes 8.5 from the above formula (1), the weighted average of the printing rate of the Lgy ink as shown in FIG. 6B becomes 20.5 from the above formula (1), and consequently the weighted average of the Lgy ink becomes the largest.

Concretely, in FIG. 6B, the printing rate of the Lgy ink for each pass (each scan) has a following relationship.

The printing rate of the 1st (n=1) pass ($f_x(n)=17$) and the 8th (n=8=N) pass ($f_x(n)=24$) is 11(%); the printing rate of the 2nd (n=2) pass ($f_x(n)=18$) and the 7th (n=7) pass ($f_x(n)=23$) is 12(%). Moreover, the printing rate of the 3rd (n=3) pass ($f_x(n)=19$) and the 6th (n=6) pass ($f_x(n)=22$) is 13(%), and the printing rate of the 4th (n=4) pass ($f_x(n)=20$) and the 5th (n=5) pass ($f_x(n)=21$) is 14(%).

Therefore, in the case of the Lgy ink like this, $\Sigma(n \times f_x(n))$ and $\Sigma f_x(n)$ are calculated as follows:

$$\Sigma(n \times f_x(n)) = 17 \times 11(\%) + 18 \times 12(\%) + 19 \times 13(\%) + 20 \times 14(\%) + 21 \times 14(\%) + 22 \times 13(\%) + 23 \times 12(\%) + 24 \times 11(\%) = 2050(\%)$$

$$\Sigma f_x(n) = 11(\%) + 12(\%) + 13(\%) + 14(\%) + 14(\%) + 13(\%) + 12(\%) + (11\%) = 100(\%)$$

Therefore, the weighted average of the printing rate of such a Lgy ink becomes 20.5(=2050/100) by the above formula (1).

Thus, regarding the inks of C, M, Y, and K, the printing is performed with relatively first-half side passes (left side passes in FIG. 6A) in 24 passes with which the printing by five color inks is completed. On the other hand, regarding the Lgy ink, the printing is performed with relatively second-half side passes (right side passes in FIG. 6B) in the 24 passes. Furthermore, regarding the Lgy ink, the maximum value of the printing rate is larger than those of other inks. Moreover, regarding the Lgy ink, a variance of the printing from the weighted average rate is smaller than those of the other inks. The variance of the printing rate from the weighted average can be expressed by a following formula (2).

$$\Sigma(n - G_x)^2 \times f_x(n))/\Sigma f_x(n) \quad (2)$$

Here, $f_x(n)$ means the printing rate of the n-th pass of the X ink (C, M, Y, K, or Lgy ink), $G_x$ means the weighted average of the X ink, and $\Sigma$ means taking a sum from 1 to the total pass number N with respect to n. As in this example, in the case where N mask pattern parts corresponding to the X ink are in the mutually complementary relationship and N passes create a printing rate (an ejection rate) of 100%, $\Sigma f_x(n)$ becomes $\Sigma f_x(n)=100(\%)$.

In this example, a variance of the printing rate of the C, M, Y, and K inks becomes 13.93 from the above formula (2), and a variance of the printing rate of the Lgy ink becomes 4.85 from the above formula (2). As show in FIGS. 6A and 6B, a reason that a maximum value of the printing rate of the Lgy ink is made larger than those of the other inks is to reconcile granularity and the degree of glossiness of a printed image, and the reason will be explained below.

Since the Lgy ink is much used to perform the printing with relatively second-half side passes than the other inks, the Lgy ink will exist most in the top surface layer of the ink layers formed on the printing medium. Then, regarding the Lgy ink like this, the maximum value of the printing rate is made larger than those of the other inks. Alternatively, regarding the Lgy ink like this, the variance of the printing rate from the weighted average is made smaller than those of the other inks. As a result, leveling that the ink droplets ejected in the same pass contact each other on the printing medium is promoted, and the degree of glossiness improves. Thus, a reason that the leveling is intended to positively occur in the Lgy ink existing most on the top surface layer is that regarding the degree of glossiness of a substance, the top surface layer dominantly affects it. This resembles covering the surface of a substance with varnish, plating, metal foil, or the like, and the ink layer that constitutes the top surface layer becomes dominant to the degree of glossiness. For example, in the case where in a 4-pass printing method, as shown in FIG. 7A to FIG. 7D, ink dots D1, D2, D3, and D4 are formed on the printing medium by an order from the 1st pass to the 4th pass, the ink dot D4 formed in the last pass will be located as the top surface layer. Moreover, as shown in FIG. 7A to FIG. 7D, it is desirable that, when forming dots with different inks in the same pass, formation positions of those dots D1, D2, D3, and D4 by those different inks may not overlap one another.

Incidentally, as described above, it is known that mutual contact of the ink droplets, ejected in the same pass, before the fixation of the ink droplets on the surface of the printing medium is completed causes leveling to decrease unevenness of the surface of the printing medium and raise the glossiness (Japanese Patent Laid-Open 2005-297212). However, if printing such that the ink droplets contact each other on the printing medium is performed, since the dot become bigger, a color having especially low lightness will become conspicuous, and the granularity will deteriorate. Moreover, there is a possibility that dots formed previously interrupt permeation of subsequent ink droplets ejected after them, the subsequent ink droplets concentrate and coagulate in a printing area on the printing medium on which dots are not formed and that is not colored. Therefore, there is a possibility that the ink with high colorant-concentration is formed bulkily at the time of the coagulation to make the unevenness of the surface of the printing medium course, which increases scattering of light and deteriorates its glossiness. Furthermore, since an ink whose colorant has a high concentration and low lightness is conspicuous, there is a possibility that if it is localized and coagulates, the granularity is deteriorated. Therefore, with a method disclosed in Japanese Patent Laid-Open No. 2005-297212, the granularity of the image deteriorates and the unevenness of the surface of the printing medium increases, and consequently it was difficult to increase the glossiness.

Then, in this embodiment, as described above, the weighted average of the printing rate of the ink having the highest lightness among the inks of the plurality of colors is made the largest and is placed in the second-half side so that the light ink whose colorant concentration is low may constitute the top surface layer. By such a printing method, it becomes possible to make deterioration of the granularity of the image inconspicuous and to suppress the roughness of the ink layer surface due to coagulation of the inks. Furthermore, the maximum value of the printing rate of the ink having the highest lightness is made larger than those of the other inks so that the ink droplets ejected in the same pass may contact each other on the printing medium and they may positively generate the leveling that decreases the unevenness. Alternatively, the variance of the printing rate from the weighted average of the ink having the highest lightness is made smaller than those of the other inks.

In this embodiment, regarding inks other than the Lgy ink, an image is completed by 16 passes in total 24 passes with which the printing by all the inks is completed. The reason is a result of division of the printing rate considering an intention of not causing deterioration of the granularity of an image arising from beading. However, the present invention is not limited to such a number of passes.

Figure 8:
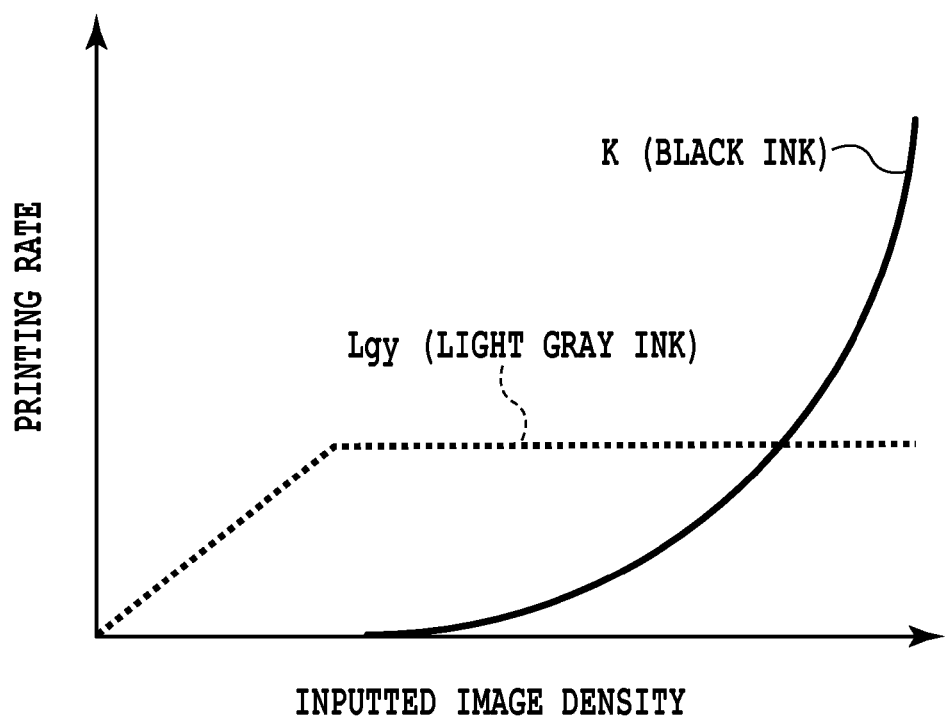
FIG. 8 is an explanatory diagram of one example of the printing rates of black ink and light gray ink to inputted image density.

The present invention enables a high effect to be exerted in the case where a dark ink and a light ink are used, and especially, in a high gradation part (a printing area where the gradation is high), it is desirable to actively use the light ink of a certain quantity or more. FIG. 8 shows one example of the printing rates of the K ink and of the Lgy ink to inputted image density in the case of printing a gray scale image using the ink sets of this example. Generally, the total ejection amount of the ink per unit printing area to the printing medium is designed no to be increased more than needed considering a glossiness feature of the printed image, consumption of the inks and the printing head, etc. Therefore, as the gradation becomes higher, the ink can often be ejected so that the printing rate of the dark ink may be raised as much as possible, and in connection with it, the printing rate of the light ink may be lowered as less as possible. In an example of FIG. 8, the Lgy ink is used by a fixed rate even in the high gradation part. Thereby, because of the above-mentioned reason, it is possible to achieve suitable granularity and the degree of glossiness of the image.

(Second Embodiment)

Figure 9:
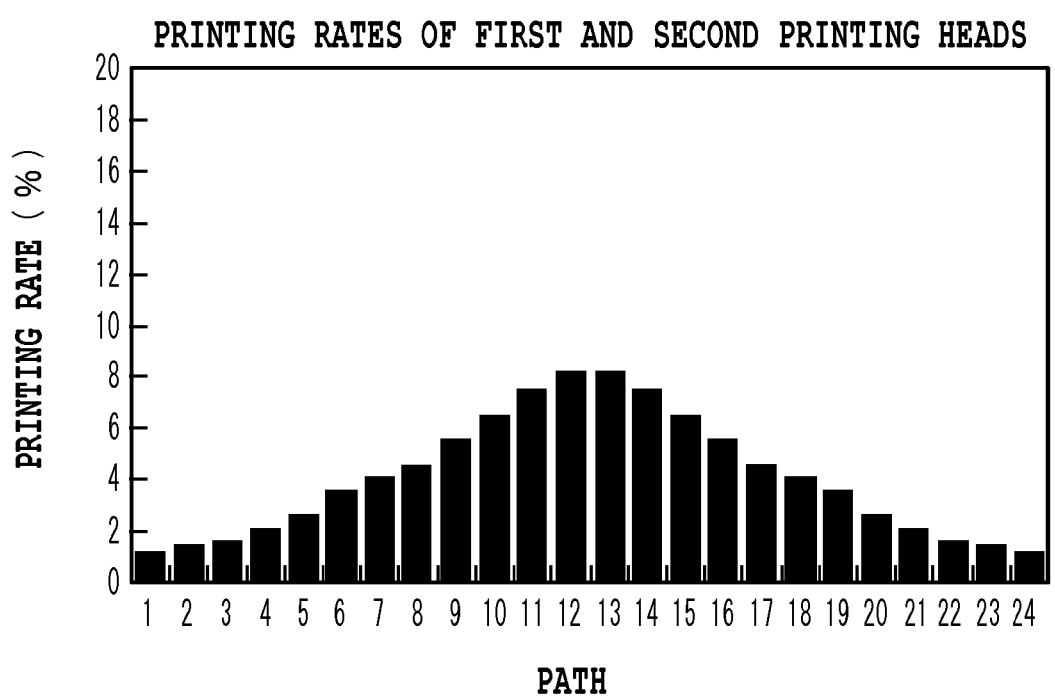
FIG. 9 is an explanatory diagram of the printing rate by the first and the second printing heads used in a second embodiment of the present invention.

It is also possible to switch a printing method according to a color of the printed image. In the above-mentioned embodiment, in an area that uses the light ink and the dark ink as in the high gradation part of the image, the printing is performed with the printing rates as shown in FIG. 6A and FIG. 6B. On the other hand, in an area that uses almost only the light ink as in a low gradation part, the printing is performed with the printing rates of the first and the second heads 10(1), 10(2) as shown in FIG. 9. Thereby, it is possible to achieve the suitable degree of glossiness and granularity in the high gradation part, and on the other hand, in the low gradation part, it is possible to suppress deterioration of the granularity of the image arising from the beading by dispersing the dot arrangement of the Lgy ink among passes and in each pass as compared with the time of high gradation printing. Moreover, it can prevent the degree of glossiness from becoming too high due to a beading phenomenon, so that the suitable degree of glossiness can be acquired. As these results, it is possible to achieve the suitable degree of glossiness and granularity from the low gradation part up to the high gradation part.

(Third Embodiment)

The first and the second embodiments take a configuration of performing the printing where the print path by the Lgy ink (light ink) and the print paths by the other inks (dark inks) do not overlap one another, namely a configuration where the printing by the light ink is performed after the printing by the dark inks is completed. However, the present invention is not limited to this, and print paths by the light ink and by the dark inks may be overlapped.

Figure 10:
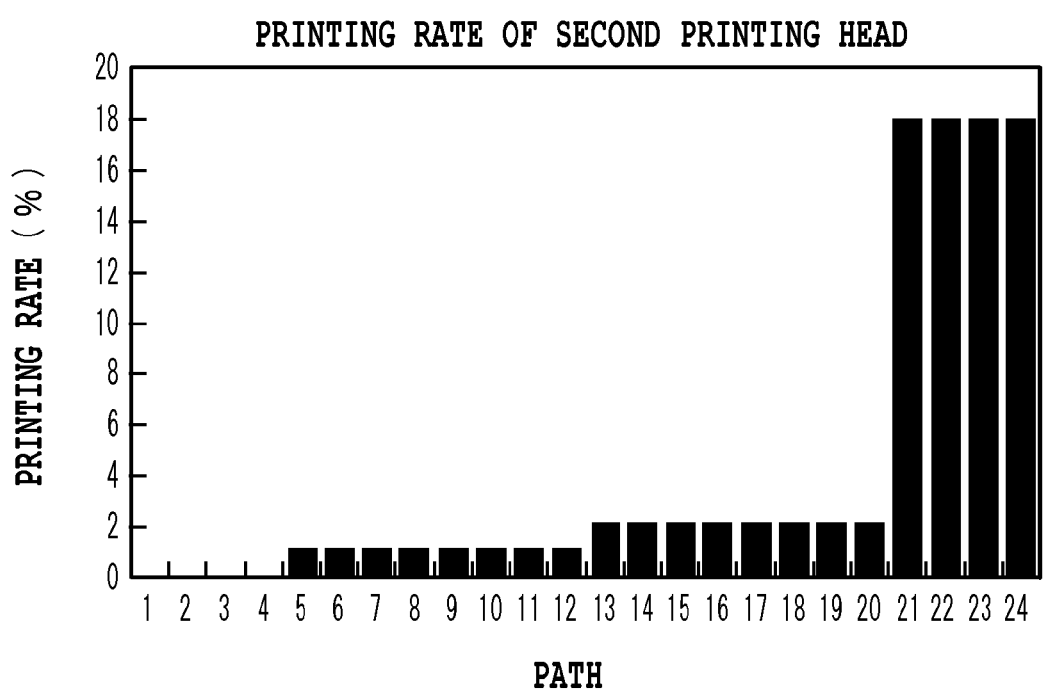
FIG. 10 is an explanatory diagram of the printing rate by the second printing head used in the third embodiment of the present invention.

In this embodiment, the printing rates of the C, M, Y, and K inks by the first printing head 10(1) are set up as shown in FIG. 6A, and the printing rate of the Lgy ink by the second printing head 10(2) is set up as shown in FIG. 10. The weighted average of the printing rate of the Lgy ink shall be located on the more second-half side (right side in FIG. 10) than those of the other inks. The weighted average of the printing rate of the C, M, Y, and K inks becomes 8.5 from the above formula (1), and on the other hand, the weighted average of the printing rate of the Lgy ink becomes 20.15 from the above formula (1).

Moreover, since the maximum of the printing rate of the Lgy ink is larger than those of the other inks while the variance of the printing rate from the weighted average of the Lgy ink in this embodiment is larger than those of the other inks, it is possible to achieve the effect of the present invention. The variance of the printing rate of the C, M, Y, and K inks becomes 13.93 from the above formula (2), and, on the other hand, the variance of the printing rate of the Lgy ink becomes 21.34 from the above formula (2). Moreover, regarding the Lgy ink having the highest lightness in the ink sets, the printing is performed in 5th to 24th passes, and regarding the other inks (the C, M, Y, and K inks), the printing is performed in 1st to 16th passes. Therefore, printing by the Lgy ink and the printing by the other inks (the C, M, Y, and K inks) overlap in 5th to 16th passes.

(Fourth Embodiment)

Figure 2B:
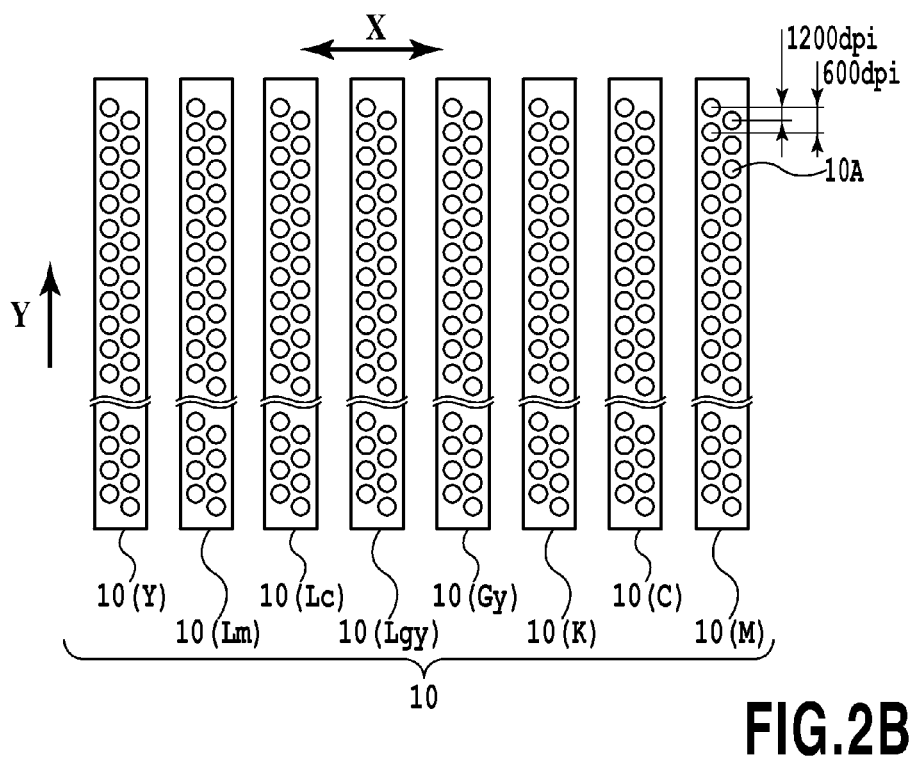
FIG. 2B is an explanatory diagram of a configuration example of a printing head that is used in a fourth embodiment of the present invention.

FIG. 2B shows a configuration example of a printing head used in this embodiment. In the case of this example, ink sets including inks that have the same hue but have different lightnesses are used. That is, an ink set of K (black), Gy (gray), and Lgy (light gray), an ink set of C (cyan) and Lc (light cyan), and an ink set of M (magenta) and Lm (light magenta) are used. Furthermore, an ink of Y (yellow) is used in addition to these ink sets. Printing heads 10 (K), 10 (Gy), 10 (Lgy), 10 (C), 10 (Lc), 10 (M), 10 (Lm), and 10 (Y) are printing heads for ejecting inks of black, gray, light gray, cyan, light cyan, magenta, light magenta, and yellow, respectively.

In this embodiment, an image is completed by the plurality of printing scans (passes) on the same printing area on the printing medium using such printing heads. In this example, a multipass printing method of 16 passes is adopted.

Figure 11A:
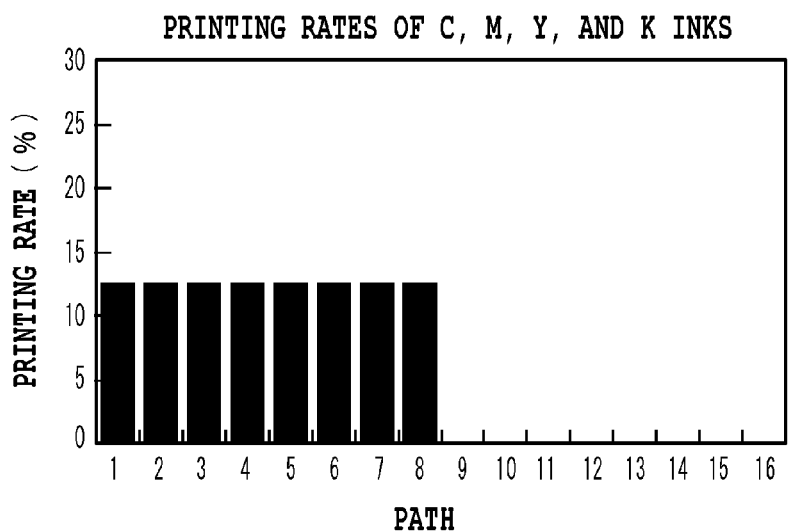
FIG. 11A to FIG. 11C are explanatory diagrams of the printing rates for respective ink colors used in the fourth embodiment of the present invention, respectively.
Figure 11B:
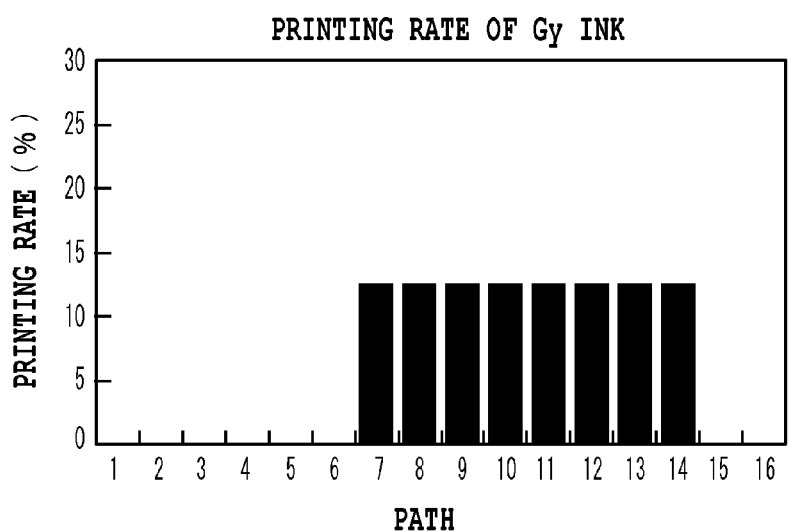
Figure 11C:
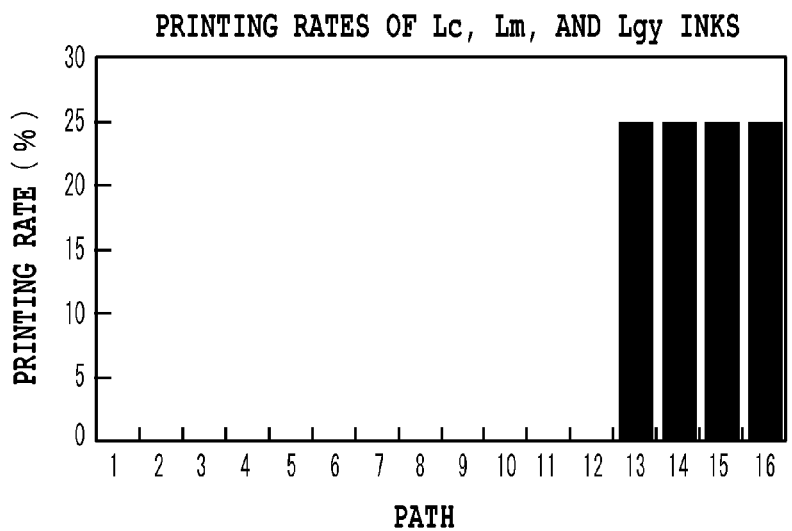

FIG. 11A, FIG. 11B, and FIG. 11C show the printing rates of respective inks in this example. FIG. 11A is the printing rate of the C, M, Y, and K inks, FIG. 11B is the printing rate of the Gy ink, and FIG. 11C is the printing rate of the Lc, Lm, and Lgy inks. As is clear from these diagrams, the weighted average of the printing rate of the Lc, Lm, and Lgy inks having the highest lightness among the ink sets is on the most second-half side (right side in FIG. 11C).

From the above formula (1), the weighted average of the printing rate of the C, M, Y, and K inks becomes 4.5, the weighted average of the printing rate of the Gy ink becomes 10.5, and the weighted average of the printing rate of the Lgy ink becomes 14.5, respectively. Moreover, the maximum value of the printing rate of the Lc, Lm, and Lgy inks is larger than those of the other inks. Moreover, the variance of the printing rate from the weighted average of the Lc, Lm, and Lgy inks is smaller than those of the other inks. That is, from the above formula (2), the variance of the printing rate of the C, M, Y, and K inks becomes 5.25; the variance of the printing rate of Gy ink becomes 5.25; and the variance of the printing rate of the Lc, Lm, and Lgy inks becomes 1.25.

In this example, three inks of the Lc, Lm, and Lgy each having the highest lightness in the ink sets is characterized by below-described (1) and (2). However, these characteristics may not necessarily exist in all the three inks. That is, in the case where there are a plurality of inks having a high lightness, at least one ink should just be provided with these characteristics, and only the Lgy ink may be provided with them. (1) The weighted average of the printing rate exists on the most second-half side. (2) The maximum value of the printing rate is higher than those of the other inks, or the variance of the printing rate from the weighted average is smaller than those of the other inks.

(Other Embodiment)

The present invention can be widely applied to printing methods each of which prints an image by a plurality of scans of the printing head to the same printing area on the printing medium using the printing head equipped with a plurality of nozzle array in each of which a plurality of nozzles each capable of ejecting an ink are arranged. That is, the present invention is applicable to various multipass printing methods of two passes or more.

Moreover, the inks of a plurality of colors that are ejected from the printing head can include a pigment ink whose coloring material is a pigment and/or a dye ink whose coloring material is a dye.

Moreover, in the above-mentioned embodiment, the precedent process, the subsequent process, the γ correction, the quantization process, and the print data generation process were performed by the host device 200. Although the example where the dot arrangement patterning process and the mask process are performed by the printing apparatus 50 was explained, the present invention is not limited to this embodiment. For example, it may be an embodiment where a part of the processes J0002 to J0005 that the host device 200 currently performs is performed by the printing apparatus 50. Alternatively, it may be a printing system for performing the processes J0002 to J0008 in the printing apparatus 50.

Moreover, the present invention includes the case where a program of software for realizing the functions of the embodiments described above is supplied to the system or apparatus directly or from a remote, and the system or a computer of the apparatus reads and executes the supplied program code to attain the functions. This is, in the embodiment described above, such a program includes contents of the flowchart shown in FIG. 12. Moreover, the present invention also includes a form of a storage medium that stores a program of software for realizing the function of the above-mentioned embodiment, and it is possible for a computer capable of reading the program stored in the storage medium to realize the function of the above-mentioned embodiment.

While the preset invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-287541, filed Dec. 18, 2009, which is hereby incorporated by reference herein in its entirety.

What is claimed is:

1. An inkjet printing apparatus for printing an image on a printing area of a printing medium by ejecting inks of a plurality of colors from a plurality of nozzles of a printing head during a plurality of scans of the printing head, the inks of the plurality of colors including a yellow ink, a first ink of a color different from that of the yellow ink, and a second ink having a substantially same hue as the first ink, a colorant concentration lower than that of the first ink, and a lightness higher than that of the yellow ink, the inkjet printing apparatus comprising:

a control unit configured to, in a case where the image is printed by a plurality of scans of the printing head onto the printing area of the printing medium, control the printing head to eject the inks of the plurality of colors so that a weighted average of a printing rate for each scan regarding the second ink becomes the largest, so that a maximum value of the printing rate for each scan regarding the second ink becomes larger than that of the inks of the plurality of colors other than the second ink, and so that a number of scans for ejecting the second ink onto the printing area is smaller than a number of scans for ejecting the inks of the plurality of colors other than the second ink onto the printing area.

2. An inkjet printing apparatus for printing an image on a printing area of a printing medium by ejecting inks of a plurality of colors from a plurality of nozzles of a printing head during a plurality of scans of the printing head, the inks of the plurality of colors including a yellow ink, a first ink of a color different from that of the yellow ink, and a second ink having a substantially same hue as the first ink, a colorant concentration lower than that of the first ink, and a lightness higher than that of the yellow ink, the inkjet printing apparatus comprising:

a control unit configured to, in a case where the image is printed by a plurality of scans of the printing head onto the printing area of the printing medium, control the printing head to eject the inks of the plurality of colors so that a weighted average of a printing rate for each scan regarding the second ink becomes the largest, so that a variance of the printing rate from the weighted average regarding the second ink becomes smaller than that of the inks of the plurality of colors other than the second ink, and so that a number of scans for ejecting the second ink onto the printing area is smaller than a number of scans for ejecting the inks of the plurality of colors other than the second ink onto the printing area.

3. The inkjet printing apparatus according to claim 1, wherein the second ink has the highest lightness among the plurality of colors.

4. The inkjet printing apparatus according to claim 3, wherein the control unit uses the second ink in a printing area where a gradation is the highest.

5. The inkjet printing apparatus according to claim 1, wherein the control unit divides print data for forming ink dots in the printing area into the plurality of scans of the printing head using a mask pattern.

6. The inkjet printing apparatus according to claim 1, wherein the inks of the plurality of colors include an ink whose coloring material is a pigment.

7. An inkjet printing method for printing an image on a printing area of a printing medium by ejecting inks of a plurality of colors from a plurality of nozzles of a printing head during a plurality of scans of the printing head, the inks of the plurality of colors including a yellow ink, a first ink of a color different from that of the yellow ink, and a second ink having a substantially same hue as the first ink, a colorant concentration lower than that of the first ink and a lightness higher than that of the yellow ink, comprising the step of:

in a case where the image is printed by a plurality of scans of the printing head onto the printing area of the printing medium, ejecting the inks of the plurality of colors from the printing head so that a weighted average of a printing rate for each scan regarding the second ink becomes the largest, so that a maximum value of the printing rate for each scan regarding the second ink becomes larger than that of the inks of the plurality of colors other than the second ink, and so that a number of scans for ejecting the second ink onto the printing area is smaller than a number of scans for ejecting the inks of the plurality of colors other than the second ink onto the printing area.

8. An inkjet printing method for printing an image on a printing area of a printing medium by ejecting inks of a plurality of colors from a plurality of nozzles of a printing head during a plurality of scans of the printing head, the inks of the plurality of colors including a yellow ink, a first ink of a color different from that of the yellow ink, and a second ink having a substantially same hue as the first ink, a colorant concentration lower than that of the first ink and a lightness higher than that of the yellow ink, comprising the step of:

in a case where the image is printed by a plurality of scans of the printing head onto the printing area of the printing medium, ejecting the inks of the plurality of colors from the printing head so that a weighted average of a printing rate for each scan regarding the second ink becomes the largest, so that a variance of the printing rate from the weighted average regarding the second ink becomes smaller than that of the inks of the plurality of colors other than the second ink, and so that a number of scans for ejecting the second ink onto the printing area is smaller than a number of scans for ejecting the inks of the plurality of colors other than the second ink onto the printing area.

9. A data generating apparatus for generating data based on which a printing head ejects ink droplets of a plurality of colors, the inks of the plurality of colors including a yellow ink, a first ink of a color different from that of the yellow ink, and a second ink having a substantially same hue as the first ink, a colorant concentration lower than that of the first ink and a lightness higher than that of the yellow ink, the data generating apparatus comprising:

a generating unit configured to, in a case where the image is printed by a plurality of scans of the printing head onto a printing area of the printing medium, generate data based on which the printing head ejects the inks of the plurality of colors so that a weighted average of a printing rate for each scan regarding the second ink becomes the largest, so that a maximum value of the printing rate for each scan regarding the second ink becomes larger than that of the inks of the plurality of colors other than the second ink, and so that a number of scans for ejecting the second ink onto the printing area is smaller than a number of scans for ejecting the inks of the plurality of colors other than the second ink onto the printing area.

10. A storage medium that stores a computer-readable program for making a computer operate as a data generating apparatus for generating data based on which a printing head ejects ink droplets of a plurality of colors, the inks of the plurality of colors including a yellow ink, a first ink of a color different from that of the yellow ink, and a second ink having a substantially same hue as the first ink, a colorant concentration lower than that of the first ink and a lightness higher than that of the yellow ink, wherein, in a case where the image is printed by a plurality of scans of the printing head onto a printing area of the printing medium, the computer operates as the data generating apparatus for generating data based on which the printing head ejects the inks of the plurality of colors so that a weighted average of a printing rate for each scan regarding the second ink becomes the largest, so that a maximum value of the printing rate for each scan regarding the second ink becomes larger than that of the inks of the plurality of colors other than the second ink, and so that a number of scans for ejecting the second ink onto the printing area is smaller than a number of scans for ejecting the inks of the plurality of colors other than the second ink onto the printing area.

11. The inkjet printing apparatus according to claim 1, wherein the yellow ink and the first ink are ejected intensively in first-half passes of the plurality of scans, and the second ink is ejected dispersively in second-half passes of the plurality of scans.

12. The inkjet printing apparatus according to claim 1, wherein the first ink and the second ink are achromatic inks.

13. The inkjet printing apparatus according to claim 1, wherein the weighted average of the printing rate is presented by $\Sigma(n \times f_x(n))/\Sigma f_x(n)$, $f_x(n)$ meaning the printing rate of an n-th scan regarding each ink, and $\Sigma$ meaning taking a sum of $f_x(n)$ from 1 to a total number of scans N with respect to n.

14. The inkjet printing apparatus according to claim 2, wherein the weighted average of the printing rate is presented by $\Sigma(n \times f_x(n))/\Sigma f_x(n)$ and the variance from the weighted average is calculated by $\Sigma((n-G_x)2 \times f_x(n))/\Sigma f_x(n)$, $f_x(n)$ meaning the printing rate of an n-th scan regarding each ink, $\Sigma$ meaning taking a sum of $f_x(n)$ from 1 to a total number of scans N with respect to n, and $G_x$ meaning the weighted average regarding each ink.

15. The inkjet printing method according to claim 7, wherein the weighted average of the printing rate is presented by $\Sigma(n \times f_x(n))/\Sigma f_x(n)$, $f_x(n)$ meaning the printing rate of an n-th scan regarding each ink, and $\Sigma$ meaning taking a sum of $f_x(n)$ from 1 to a total number of scans N with respect to n.

16. The inkjet printing method according to claim 8, wherein the weighted average of the printing rate is presented by $\Sigma(n \times f_x(n))/\Sigma f_x(n)$ and the variance from the weighted average is calculated by $\Sigma((n-G_x)2 \times f_x(n))/\Sigma f_x(n)$, $f_x(n)$ meaning the printing rate of an n-th scan regarding each ink, $\Sigma$ meaning taking a sum of $f_x(n)$ from 1 to a total number of scans N with respect to n, and $G_x$ meaning the weighted average regarding each ink.

17. The data generating apparatus according to claim 9, wherein the weighted average of the printing rate is presented by $\Sigma(n \times f_x(n))/\Sigma f_x(n)$, $f_x(n)$ meaning the printing rate of an n-th scan regarding each ink, and $\Sigma$ meaning taking a sum of $f_x(n)$ from 1 to a total number of scans N with respect to n.

18. The storage medium according to claim 10, wherein the weighted average of the printing rate is presented by $\Sigma(n \times f_x(n))/\Sigma f_x(n)$, $f_x(n)$ meaning the printing rate of an n-th scan regarding each ink, and $\Sigma$ meaning taking a sum of $f_x(n)$ from 1 to a total number of scans N with respect to n.

* * * * *